United States Patent [19]
Toyonaga et al.

[11] Patent Number: 5,479,657
[45] Date of Patent: Dec. 26, 1995

[54] SYSTEM AND METHOD FOR SORTING COUNT INFORMATION BY SUMMING FREQUENCIES OF USAGE AND USING THE SUMS TO DETERMINE WRITE ADDRESSES

[75] Inventors: Masahiko Toyonaga; Toshiro Akino; Hiroaki Okude, all of Takatsuki, Japan

[73] Assignee: Matsushita Electric Industrial Co., Ltd., Osaka, Japan

[21] Appl. No.: 76,939

[22] Filed: Jun. 16, 1993

Related U.S. Application Data

[63] Continuation of Ser. No. 492,793, Mar. 13, 1990, abandoned.

[30] Foreign Application Priority Data

Mar. 17, 1989 [JP] Japan .................. 1-67011

[51] Int. Cl.⁶ .................. G06F 7/24; G06F 7/00
[52] U.S. Cl. .................. 395/600; 395/800; 364/222.9; 364/962.3; 364/963.2; 364/DIG. 1
[58] Field of Search .................. 395/600, 800

[56] References Cited

U.S. PATENT DOCUMENTS

| | | | |
|---|---|---|---|
| 4,031,520 | 6/1977 | Rohner | 395/800 |
| 4,295,206 | 10/1981 | cain et al. | 395/600 |
| 4,499,555 | 2/1985 | Huang | 395/800 |
| 4,510,567 | 4/1985 | Chang et al. | 395/600 |
| 4,570,221 | 2/1986 | Martens | 395/425 |
| 4,611,280 | 9/1986 | Linderman | 395/800 |
| 4,809,158 | 2/1989 | McCauley | 395/600 |
| 5,091,848 | 2/1992 | Kojima | 395/800 |

OTHER PUBLICATIONS

"A class of Sorting Algorithms Based on Quicksort" (Communications of the ACM, vol. 28 No. 4, pp. 396–412, Apr. 1985) by R. L. Wainwright.
"Data Structure and Algorithms: (Addison–Wesley Publishing Company Reading, Mass., 1983)"by A. V. Aho, et al.
Kruse; "Data Structure & Program Design"; Prentice–Hall Inc. chapter 4, pp. 139–188 1984.
Cooper; "Oh! Pascal!"; Chapter 165 by W. W. Norton & Company, Inc. pp. 527–548 1985, 1982.

*Primary Examiner*—Krisna Lim
*Attorney, Agent, or Firm*—Stevens, Davis, Miller & Mosher

[57] ABSTRACT

A method and system for sorting count information in a computer. Frequencies of usage of count information to be sorted are determined, accumulation information are prepared based on the frequency of usage information. Regarding the accumulation information as the post-sort sequence information, the post-sort information is prepared by using the post-sort sequence information and implementation of the post-sort sequence information.

The frequency of usage information designates the write position of the post-sort sequence information and sorts the count information in the ascending or descending order.

12 Claims, 18 Drawing Sheets

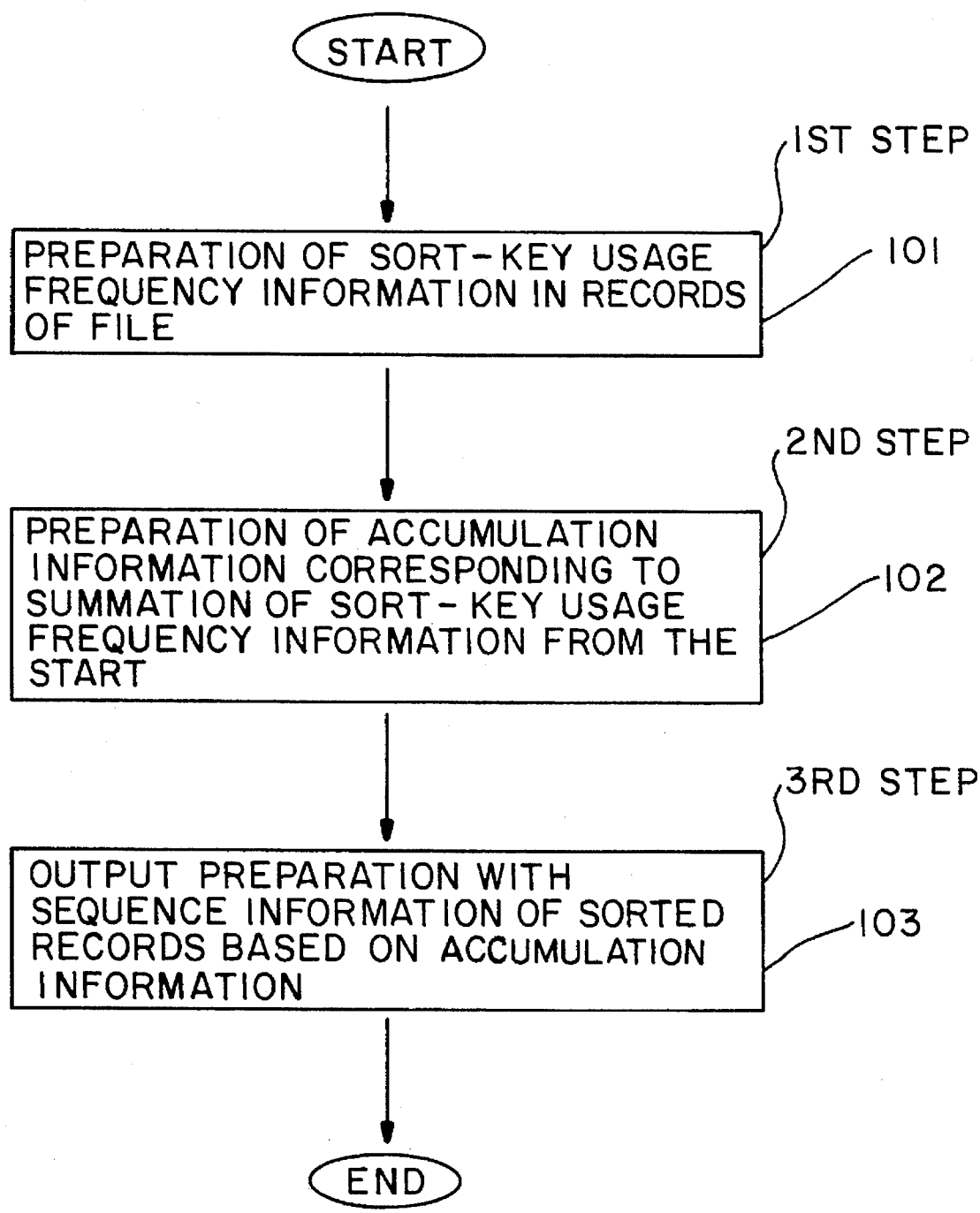

FIG.2A

2. INFORMATION TO BE SORTED
1. SORT-KEY INFORMATION

| 8 | H |
|---|---|
| 6 | F |
| 5 | E |
| 1 | A |
| 1 | B |
| 2 | D |
| 3 | C |
| 7 | G |

4. BASIC INFORMATION UNIT

3. SORT-KEY ASSOCIATED INFORMATION

FIG.2B

MEMORY V

| 1 | 0 |
|---|---|
| 2 | 0 |
| 3 | 0 |
| 4 | 0 |
| 5 | 0 |
| 6 | 0 |
| 7 | 0 |
| 8 | 0 |

ADDRESS    STORED CONTENT

FIG.2C

MEMORY V       6. FREQUENCY OF USAGE INFORMATION

| 1 | 2 |
|---|---|
| 2 | 1 |
| 3 | 1 |
| 4 | 0 |
| 5 | 1 |
| 6 | 1 |
| 7 | 1 |
| 8 | 1 |

ADDRESS    STORED CONTENT

FIG.2D

MEMORY V       7. ACCUMULATION INFORMATION

| 1 | 1 |
|---|---|
| 2 | 3 |
| 3 | 4 |
| 4 | 5 |
| 5 | 5 |
| 6 | 6 |
| 7 | 7 |
| 8 | 8 |

ADDRESS    STORED CONTENT

FIG. 2E

MEMORY V   8. SEQUENCE INFORMATION

| 1 | 1 |
|---|---|
| 2 | 3 |
| 3 | 4 |
| 4 | 5 |
| 5 | 5 |
| 6 | 6 |
| 7 | 7 |
| 8 | 8 |

ADDRESS   STORED CONTENT

FIG. 2F

2. INFORMATION TO BE SORTED

| 8 | H |
|---|---|
| 6 | F |
| 5 | E |
| 1 | A |
| 1 | B |
| 2 | D |
| 3 | C |
| 7 | G |

1. SORT-KEY INFORMATION
3. SORT-KEY ASSOCIATED INFORMATION

MEMORY V   8. SEQUENCE INFORMATION

| 1 | 1 |
|---|---|
| 2 | 3 |
| 3 | 4 |
| 4 | 5 |
| 5 | 5 |
| 6 | 6 |
| 7 | 7 |
| 8 | 8 |

ADDRESS   STORED CONTENT

9. OUTPUT INFORMATION

| 1 |   |
|---|---|
| 2 |   |
| 3 |   |
| 4 |   |
| 5 |   |
| 6 |   |
| 7 |   |
| 8 | 8, H |

FIG. 2G

MEMORY V   8. SEQUENCE INFORMATION

| 1 | 1 |
|---|---|
| 2 | 3 |
| 3 | 4 |
| 4 | 5 |
| 5 | 5 |
| 6 | 6 |
| 7 | 7 |
| 8 | 9 |

ADDRESS   STORED CONTENT

FIG.2H

10. PROCESSED RESULT

| 1 | 1, A |
|---|---|
| 2 | 1, B |
| 3 | 2, D |
| 4 | 3, C |
| 5 | 5, E |
| 6 | 6, F |
| 7 | 7, G |
| 8 | 8, H |

MEMORY V

8. SEQUENCE INFORMATION

| 1 | 3 |
|---|---|
| 2 | 4 |
| 3 | 5 |
| 4 | 5 |
| 5 | 6 |
| 6 | 7 |
| 7 | 8 |
| 8 | 9 |

ADDRESS   STORED CONTENT

FIG. 4A

2. INFORMATION TO BE SORTED

MEMORY S

11. INPUT SEQUENCE INFORMATION

| 1 | 1 |
|---|---|
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |

ADDRESS    STORED CONTENT

1. SORT-KEY INFORMATION
3. ASSOCIATED INFORMATION

| 8 | K |
|---|---|
| 6 | H |
| 5 | G |
| 4 | F |
| 1 | A |
| 2 | C |
| 3 | D |
| 8 | L |
| 6 | I |
| 1 | B |
| 6 | J |
| 3 | E |

FIG. 4B

MEMORY V

6. FREQUENCY OF USAGE INFORMATION

| 1 | 0 |
|---|---|
| 2 | 0 |
| 3 | 0 |
| 4 | 0 |
| 5 | 0 |
| 6 | 0 |
| 7 | 0 |
| 8 | 0 |

K {

ADDRESS    STORED CONTENT

FIG. 4C

MEMORY V — 6. FREQUENCY OF USAGE INFORMATION

| ADDRESS | STORED CONTENT |
|---|---|
| 1 | 2 |
| 2 | 1 |
| 3 | 2 |
| 4 | 1 |
| 5 | 1 |
| 6 | 3 |
| 7 | 0 |
| 8 | 2 |

FIG. 4D

MEMORY V — 7. ACCUMULATION INFORMATION

| ADDRESS | STORED CONTENT |
|---|---|
| 1 | 1 |
| 2 | 3 |
| 3 | 4 |
| 4 | 6 |
| 5 | 7 |
| 6 | 8 |
| 7 | 8 |
| 8 | 11 |

FIG. 4E

2. INFORMATION TO BE SORTED

MEMORY S — 11. INPUT SEQUENCE INFORMATION

| ADDRESS | STORED CONTENT |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |

1. SORT-KEY INFORMATION / 3. ASSOCIATED INFORMATION

| 8 | K |
|---|---|
| 6 | H |
| 5 | G |
| 4 | F |
| 1 | A |
| 2 | C |
| 3 | D |
| 8 | L |
| 6 | I |
| 1 | B |
| 6 | J |
| 3 | E |

MEMORY V — 8. SEQUENCE INFORMATION

| ADDRESS | STORED CONTENT |
|---|---|
| 1 | 1 |
| 2 | 3 |
| 3 | 4 |
| 4 | 6 |
| 5 | 7 |
| 6 | 8 |
| 7 | 8 |
| 8 | 11 |

MEMORY Sx — 12. OUTPUT SEQUENCE INFORMATION

| ADDRESS | STORED CONTENT |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 1 |
| 12 | 0 |

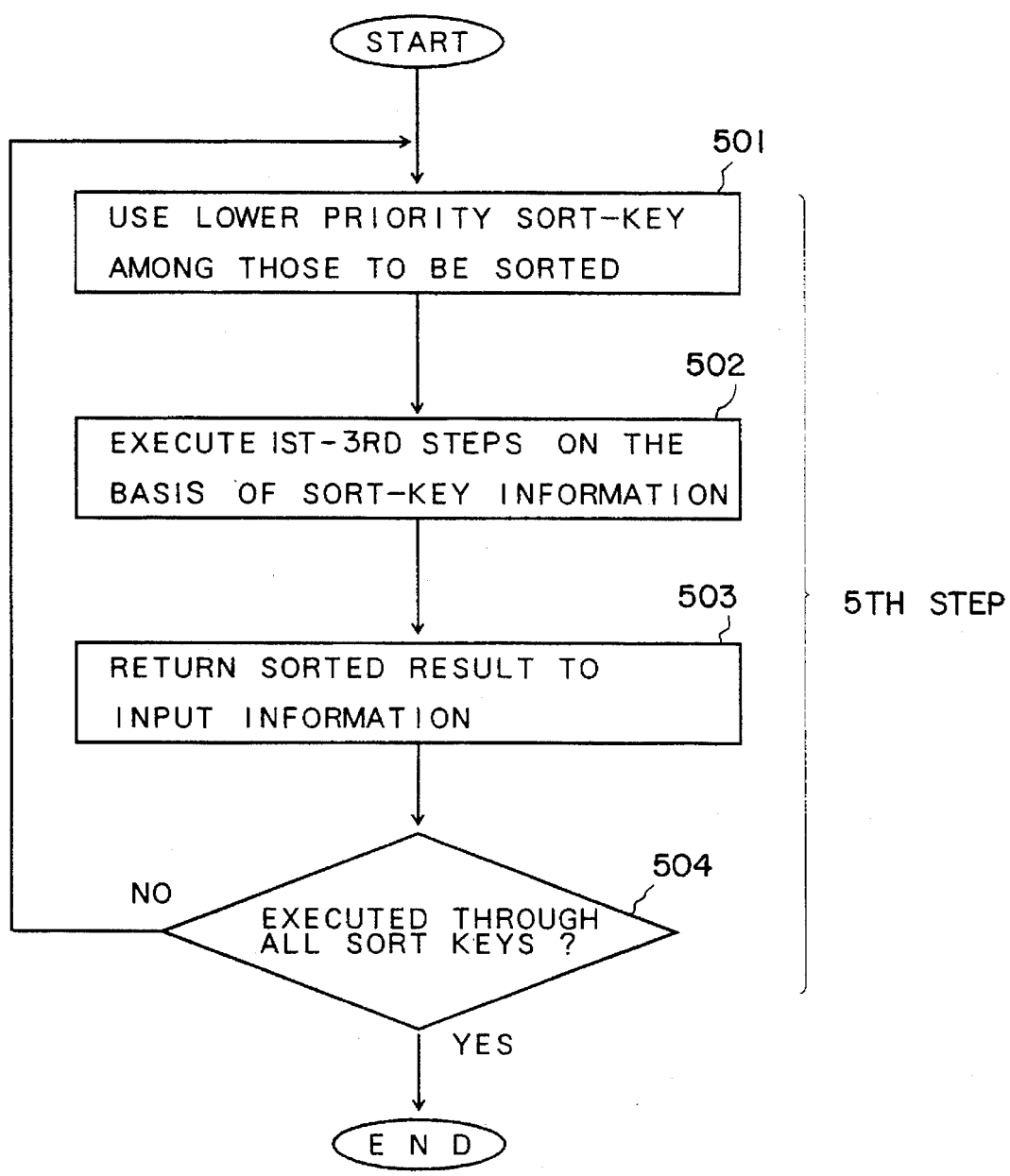

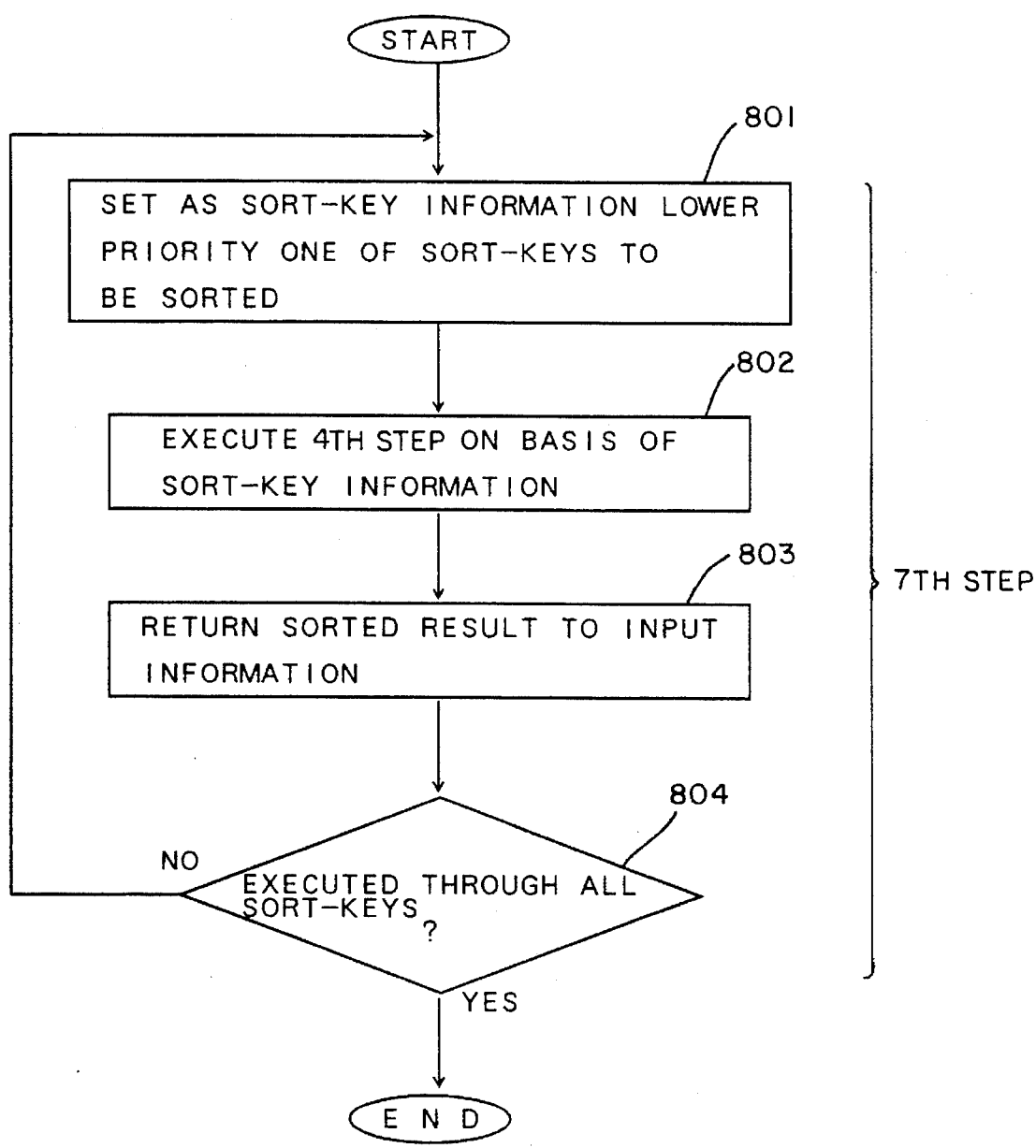

```
1   /*      sort<>test program
2   /*      Copyright by Masahiko Toyonaga
3   /*                      Feb. 17. 1989
4   #includ         <stdio.h>
5   #define         MAX_DATA        100
6   #define         MAX_KEY         100
7   #define         IDX             9999999
8   #define         OFF             0
9   #define         key1            0
10  #define         key2            1
11  struct dataformat {
12          int     sort [2] ;
13          char    data [10] ;
14  } ;
15  struct dataformat       D [MAX_DATA] ;
16  int     s [MAX_DATA]            ;
17  int     N=8;
18  int     min [2], max [2] ;
19
20  main    ()
21  {
22  FILE    *input ;
23  int     i, j ;
24          input =fopen ("sort_input", "r") ;
25          min [key1] =IDK;max [key1] =OFF;
26          min [key2] =IDK;max [key2] =OFF;
27  /****** initial data setting **********step1 */
28          for (i=1;i<=N;i++) {
29                  fscanf (input, "%d %d %s", &D [i]. sort [key1].
30                          &D [i]. sort [key2], D [i], data) ;
31                  s [i] =i;
```

FIG.9A-1
*/
*/
*/

```
32        if (min [key1] >D [i]. sort (key1)) min [key1] =D [i]. sort (key1);
33        if (max [key1] <D [i]. sort (key1)) max [key1] =D [i]. sort (key1);
34        if (min [key2] >D [i]. sort (key2)) min [key2] =D [i]. sort (key2);
35        if (max [key2] <D [i]. sort (key2)) max [key2] =D [i]. sort (key2);
36   }
37   fclose (input);
38        printf ("******** input data dump **********\n");
39        for (i=1;i<=N;i++) {
40             printf ("%d) %d %s\n", i, D [i]. sort (key1),
41                    D [i]. sort (key2), D [i]. data);
42        }
43
44   flash_sort (key2);
45
46        printf ("******** medium process data dump **********\n");
47        for (i=1;i<=N;i++) {
48             printf ("%d) %d %s\n", i, D [s [i]]. sort (key1),
49                    D [s [i]]. sort (key2), D [s [i]]. data);
50        }
51
52   flash_sort (key1);
53
54   /****** final_data setting ********** step6 */
55        printf ("******** output data dump **********\n");
56        for (i=1;i<=N;i++) {
57             printf ("%d) %d %s\n", i, D [s [i]]. sort (key1),
58                    D [s [i]]. sort (key2), D [s [i]]. data);
59        }
60
61   }
62
63
```

```
64  /****************************************************************
65  /***Function              :flash_sort                           ***
66  /****************************************************************
67   int    flash_sort (key)
68   int    key          ;
69   {
70    int    V [MAX_KEY]           ;
71    int    sx [MAX_DATA]         ;
72    int    i, Sum  k,  j;
73    for (k=min [key] ;k<=max [key] ;k++) {
74         V [k] =0;
75    }
76    /* set frequency for each value */
77    for (i=1; i<=N; i++) {
78         k=D [s (i)]. sort [key] ;
79         V [k] =V [k] +1;
80    }
81    /* set data pointer */
```

FIG. 9B-2

```
85   Sum=1;
86   for (j=min[key];j<=max[key];j++) {
87      k=V[j];
88      V[j]=Sum;
89      Sum=Sum+k;
90   }
91   /* sort data by setting data to sdata*/
92   for (i=1;i<=N;i++) {
93      k=D[s[i]],sort[key];
94      j=V[k];
95      sx[j]=s[i];
96      V[k]++;
97   }
98   for (i=1;i<=N;i++) {
99      s[i]=sx[i];
100  }
101  return(0);
102  }
```

```
1  **********  input data dump  **********
2   1) 18c
3   2) 26c
4   3) 35h
5   4) 11a
6   5) 21d
7   6) 34g
8   7) 13b
9   8) 27f
10 **********  medium process data dump  **********
11  1) 11a
12  2) 21d
13  3) 13b
14  4) 34g
15  5) 35h
16  6) 26e
17  7) 27f
18  8) 18c
19 **********  output data dump  **********
20  1) 11a
21  2) 13b
22  3) 18c
23  4) 21d
24  5) 26e
25  6) 27f
26  7) 34g
27  8) 35h
```

FIG. 9C

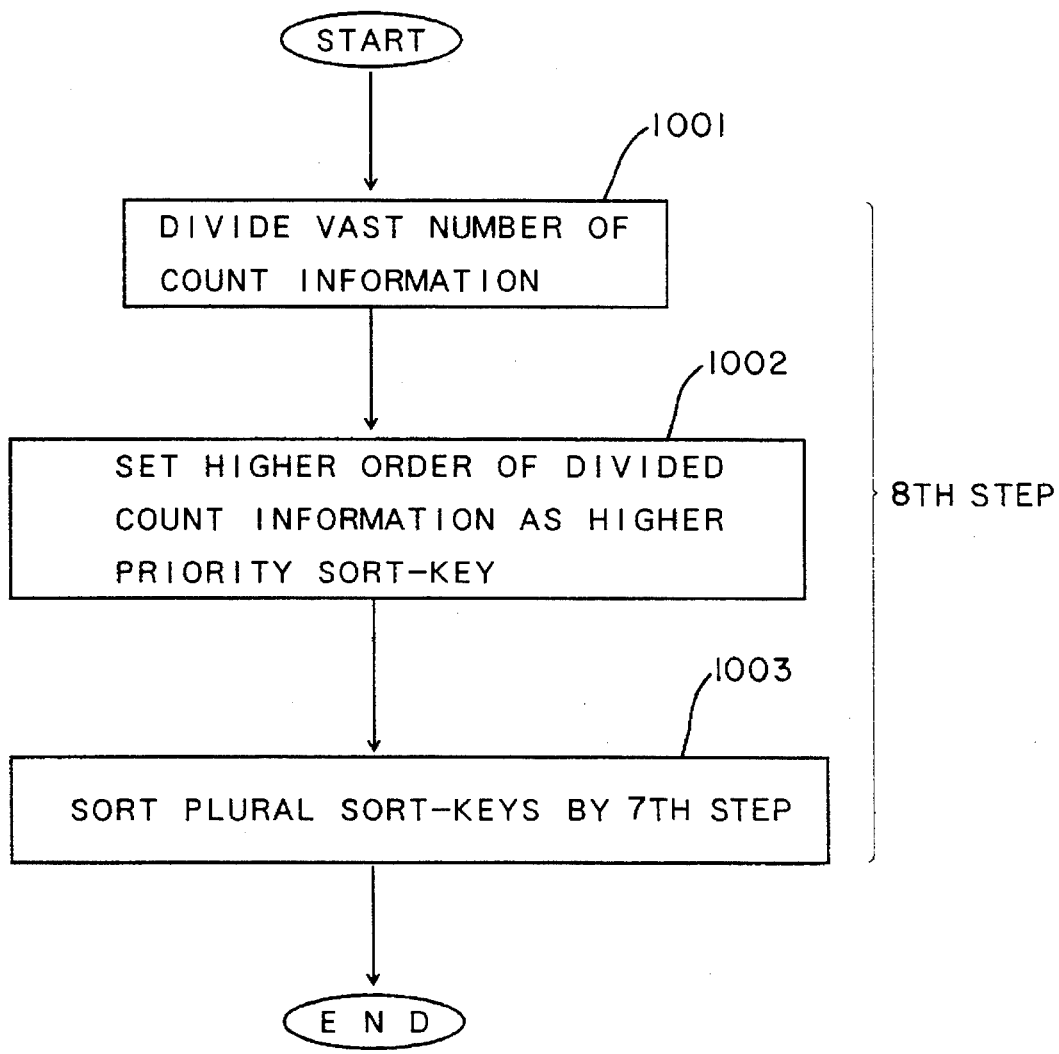

SYSTEM AND METHOD FOR SORTING COUNT INFORMATION BY SUMMING FREQUENCIES OF USAGE AND USING THE SUMS TO DETERMINE WRITE ADDRESSES

This application is a continuation of application Ser. No. 07/492,793, filed Mar. 13, 1990 (abandoned).

BACKGROUND OF THE INVENTION

The present invention relates to method and system for sorting information having a number of counts to be handled by a computer.

In recent years, as the quantity of information to be handled by the computer has increased, a technique to improve an efficiency of information handling by the computer in order to overcome a problem of long processing time has become important. In one method which is frequently used to improve the efficiency of processing of the information to be processed by the computer, a most efficient processing sequence is recorded by counts, the information is sorted in accordance with the counts, and then actual information processing is carried out. In accordance with this method, repeated reference to the same information is avoided as much as possible so that the processing time of the computer is significantly reduced.

For example, in a hierarchical information processing method which reduces the processing time of the computer, hierarchical information represented by counts is added to input information as a pre-process, and the input information is sorted in accordance with the counts. Since the information in the same hierarchical level is arranged closely by the above process, it is not necessary to search all of the information to retrieve the information in one hierarchical level if the information in that level is to be processed; rather, the sorted information may be referred sequentially to process it sequentially. Accordingly, the retrieval time can be saved.

Another example is determination of a close relationship of patterns in a computer geometry. In a process to determine the close relationship of the patterns, coordinate information of a pattern is read from input information and a pattern having close coordinate is retrieved from the input information. If the coordinates of the pattern information are deemed counts and the input information is sorted in accordance with the counts, the close pattern can be searched by merely reading out the input information sequentially. Thus, the efficiency of the processing is improved and the processing time of the computer is saved.

As described above, since the sorting of the information having the counts is an important technique to improve the efficiency of information processing, various techniques to improve the efficiency of the sorting per se of the information having the counts have been studied.

One of most efficient sorting methods for the information having the counts in a conventional computer is a Quick-Sort method as described by R. L. Wainwright in "A Class of Sorting Algorithm Based on Quick sort", Communications of the ACM, Vol. 28, No. 4, pp 396–402, April 1985 and a Radix-sort method mentioned by A. V. Aho in "Data Structure and Algorithms," Addison Wesley Publishing Company Reading, Massachusetts, 1983.

In the Quick-Sort method whether a count (sort key information) which is used as a reference to rearrange an information unit of information to be sorted is larger or smaller than an appropriately set intermediate value is checked, and a bi-splitting process of the information is repeated to attain sort result information. The bi-splitting process, is repeated for each of the bi-split information until individual information units are obtained in the n-th step. Thus, assuming that N information units are to be sorted by bi-splitting the N information units n times until each split area includes only one information unit, n is approximately represented by $$n = \log_2(N)$$

Since the split process is done for all of the N records of the information to be sorted, the number of steps or the computer processing time T required to sort all the records by the Quick-Sort method is approximately $$T = C_q\ N\ \log_2(N)$$

where $C_q$ is a proportional constant. Accordingly, in the prior art sorting technique of the information having the counts in the computer, as the number of record N increases, the cost of the computer increases in proportion to $N\ \log_2(N)$.

In the Radix-Sort method, an address memory for addressing the sort key which is used as the reference to rearrange the information to be sorted is provided, and the information to be sorted corresponding to the sort keys is sequentially read, one information unit at a time, and written into list information 7 controlled by the address memory. Finally, the listed information is read from the beginning and the sorting is completed. It is necessary to additionally write pointer information which points the beginning of the next information of the list in order to control the list information.

Assuming that N information is to be sorted and maximum count is K, the number of steps or the computer processing time T required to sort all of the information is approximately $$T = C_r\ (N+K)$$

Thus, the computer processing time T is improved over that of the Quick-Sort method. However, in the latter method which requires the pointer control, a waiting time for the processing may become long depending on the capacity of the main memory of the computer because the continuity of the data is not assured. Further, the pointer control requires an essentially complex process.

In the prior art sorting method of the count information in the computer, either the time-consuming complex method or method which requires the pointer control and many steps is used. Thus, where the quantity of information is larger and the count information to be sorted is complex, the increase of the computer cost was unavoidable.

SUMMARY OF THE INVENTION

The present invention is intended to solve the problems encountered in the prior art and it is an object of the present invention to provide a method and system for sorting count information in which the increase of a computer cost when the quantity N of count information increases is suppressed to be in proportion to N.

In accordance with an aspect of the present invention, there is provided a method for sorting count information in a computer by performing the following steps;

determining frequencies of usage of count information to be sorted;

preparing accumulation information based on the frequency of usage information; and regarding the accumulation information as the post-sort sequence information, and writing the input information into the post-sort information by using the post-sort sequence information and implementation of the post-sort sequence information.

In accordance with an aspect of the present invention, there is provided a system for performing this method, the system having components for doing the following:

(a) reading information having counts to be sorted to prepare a first memory representation of a direct access type having a count range of the count information as an address range, and initializing said first memory representation;

(b) incrementing by one the first memory of the direct access type having the count as the address, for each of the input information to prepare frequency of usage information for each count on the first memory of the direct access type;

(c) initializing accumulation of the frequency of usage of the count stored in a second memory of the direct access type, to zero, adding the frequency of usage or the address to the accumulation in an ascending order of the address of the second memory representation of the direct access type when the sorting in the ascending order is desired and in ascending order of the address when the sorting in the descending order is desired, and writing the accumulation prior to the addition of the frequency of usage into the second memory of the direct access type designated by said address to prepare accumulation information of the counts starting from "1" and smaller than each count into the second memory of the direct access type when the sorting in the ascending order is desired and prepare the accumulation information of counts larger than each count when the sorting in the descending order is desired; and (d) writing a unit of the input information from the beginning, as the units of the post-sort information, the accumulation stored in the second memory representation of the direct access type having the counts as the address, as the sequence of the unit of post-sort information, and adding one to the accumulation in the second memory of the direct access type to prepare the sequence for the next unit of the input information having the same count, and repeat above process for every unit of the input information.

In accordance with the above method and system, where the number of input information units is N and the range of the count is K, N+K steps in (a) N steps in (b), K steps in (c) N steps in (d) are required. Thus, the computer processing time is approximately T=Cf (N+K)

which is much shorter than that of the Quick-Sort method which has been known to require a shortest computer processing time.

In the present invention, the operations to be carried out are only addition, and the number of steps in each process is smaller than Radix-Sort method that requires the change of pointer process. Namely, Cf<Cr. Accordingly, the computer cost is much lower than those of the Quick-Sort method and the Radix-Sort method which have been considered to take lowest computer cost.

BRIEF DESCRIPTION OF THE DRAWINGS

FIG. 1 shows a flow chart of the first embodiment of the present invention.

FIG. 2(a) shows information to be sorted.

FIG. 2(b) shows the initial condition of direct access memory V with addressees and contents.

FIG. 2(c) the direct access memory V with the sort-key usage frequency information after the 1st step operation.

FIG. 2(d) shows the direct access memory V with the sort-key usage frequency accumulation information after the 2nd step operation.

FIG. 2(e) shows the direct access memory V with the sorted record sequence information corresponding to the sort-key usage frequency accumulation information after the 2nd step operation.

FIG. 2(f) shows information to be sorted (left), the sorted record sequence information (center), and the sorted result output file (right) after processing the 3rd step operation.

FIG. 2(g) shows the direct access memory V after the 3rd step operation.

FIG. 2 (h) shows the sorting processed result file with the direct access memory V after the 3rd step operation.

FIG. 4 (c) shows the direct access memory V with the sort-key usage frequency information after the 1st operation of 4th step.

Fig, 4 (d) shows the direct access memory V with the sort-key usage frequency accumulation information after the 2nd operation of 4th step.

FIG. 4(e) shows the initial sequence information, information to be sorted, the direct access memory V with the sorted record sequence information corresponding to the sort-key usage frequency accumulation information after the 2nd step operation, sorted-sequence inflation file prepared after 3rd operation of step 4 under processing the 4th operation of 4th step.

Figure 4F:
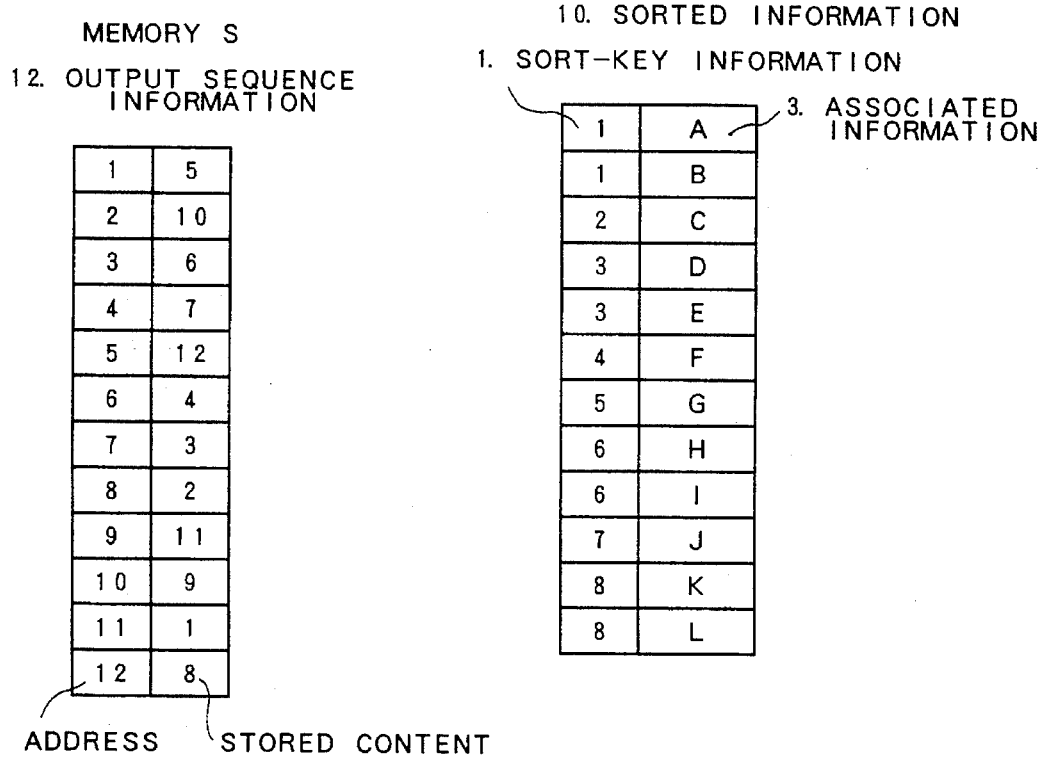
FIG. 4 (a) shows the sequence of address information prepared after the first operation of the 4th step, with the information to be sorted.
FIG. 4(b) shows the initial condition of direct access memory V with addresses and contents.

FIG. 4(f) shows the sequence of address information with sorted address information an the output of 4th step.

Figure 6A:
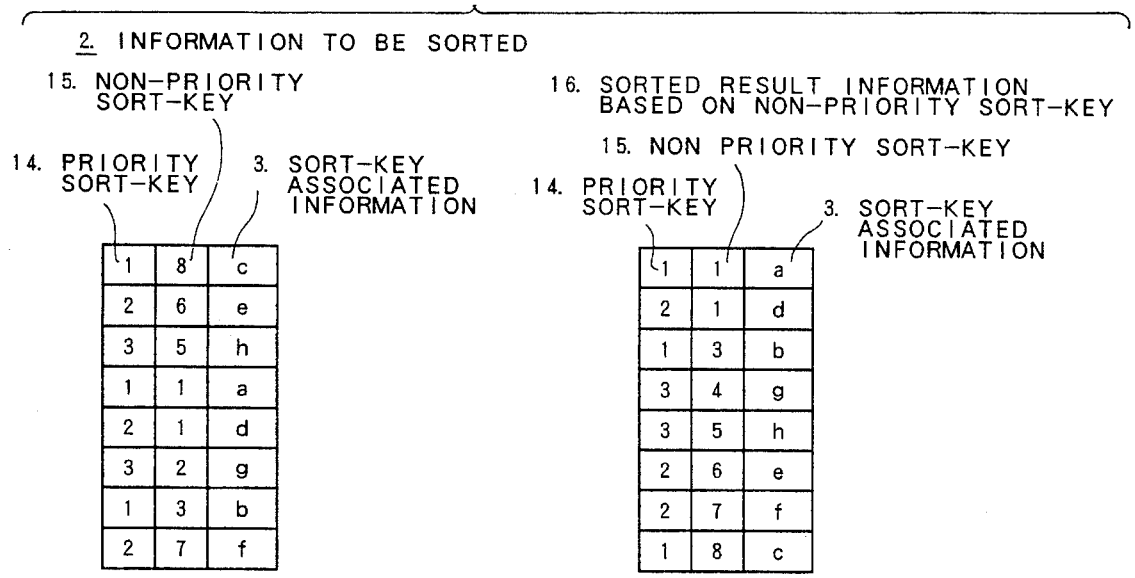
Figure 6B:
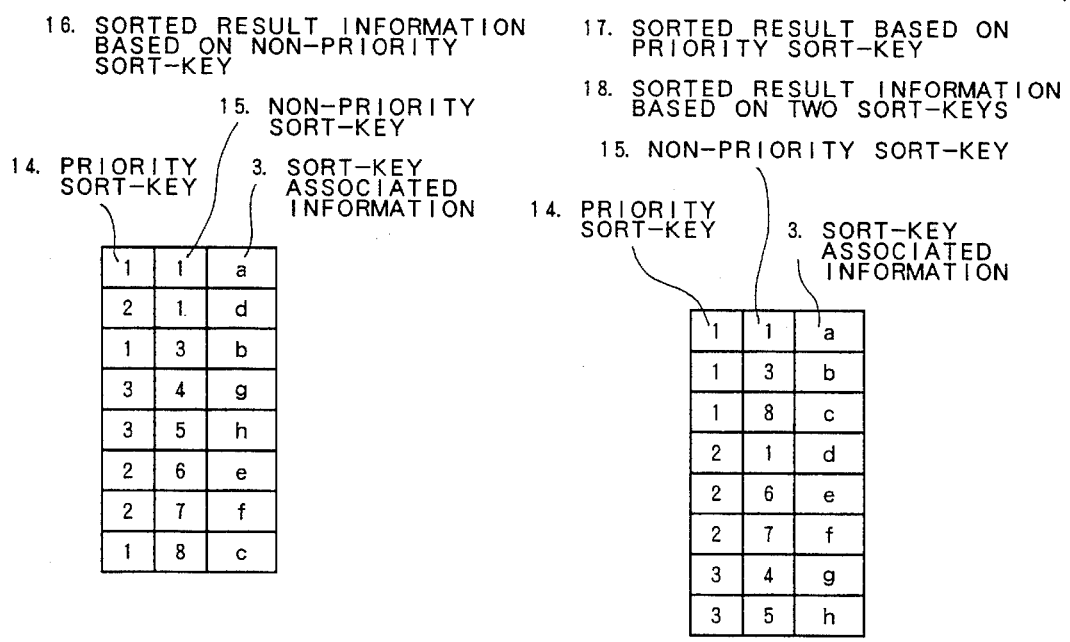

FIG. 5, and FIGS. 6(a) to 6(b) illustrate the second embodiment of the present invention.

Figure 7:
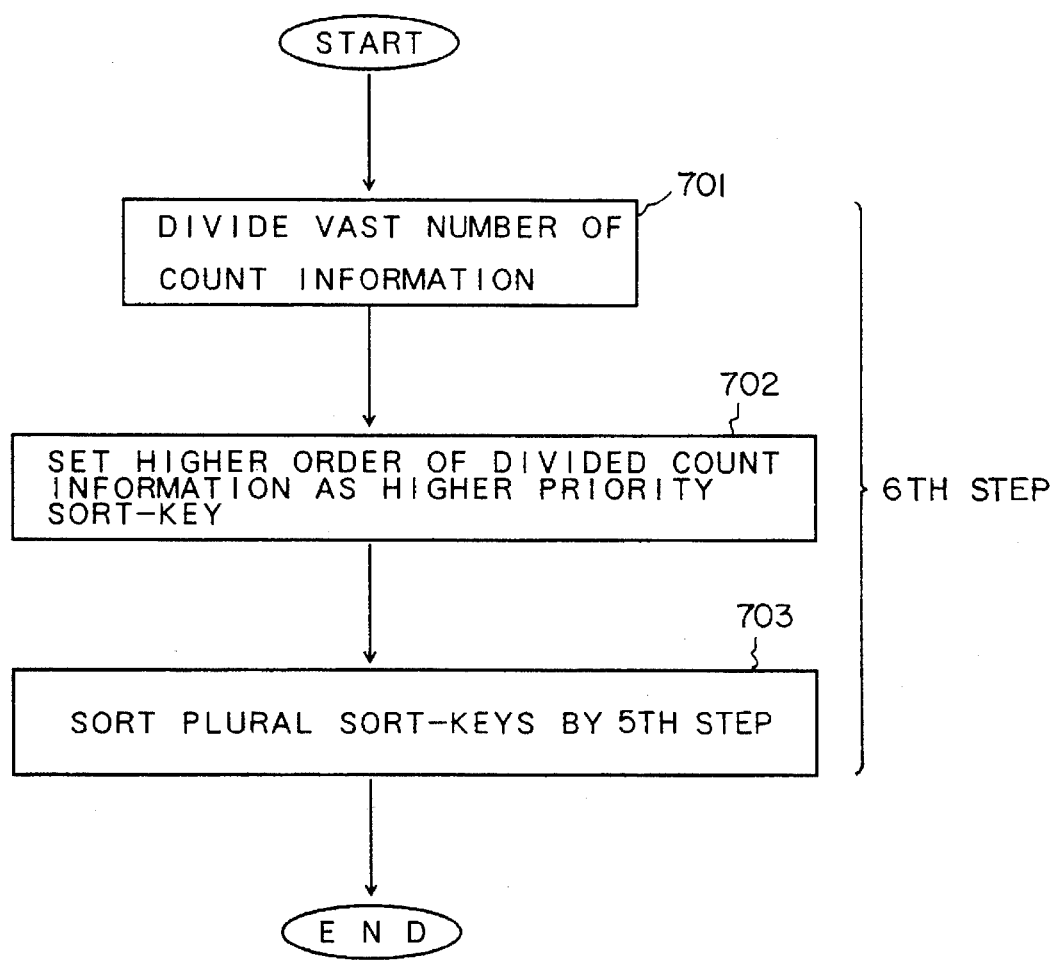

FIGS. 7 and 8 show flow charts of the present invention.

FIGS. 9(a) and 9(b) show computer code to implement the present invention.

FIG. 9(c) shows a result of execution of the code of FIGS. 9(a) and 9(b).

FIG. 10 shows a flow chart of the present invention.

DESCRIPTION OF THE PREFERRED EMBODIMENTS

FIG. 1 shows a flow chart of a sort algorithm of the first embodiment of the present invention. The sort algorithm comprises three steps 101–103. In a first step 101, information to be sorted is read out and prepared the frequency of usage information of the sort keys, by type, in a direct access memory.

In a second step 102, preparing the accumulation information to a second memory of the sort keys, by type, in a direct access memory, by using the first memory and a temporary accumulation information. First set "1" to the temporary accumulation information, and set it the accumulation information of the sort keys, by type, add the value of the frequency of usage of sort-key information of the sort keys, by type to the temporary accumulation information. Repeat above process by the ascending order if ascending order sorting is desired, and repeat above process by the ascending order if ascending order sorting is desired.

In the third step 103, regarding the accumulation information of sort-key, by type, in the direct access memory as the post-sort sequence information of the unit of the information to be sorted, write one unit of the input information to the post-sort information by using the post-sort sequence information in the second memory of sort-key, by type, and add one to the post-sort sequence information in the second memory of sort-key, by type.

More specific expression is given with reference to FIGS. 2(a) to 2(h). FIGS. 2(a) to 2(h) illustrate the process of the present embodiment from information to be sorted 2 to the sorted information 10 having one count information to be sorted (sort-key).

FIG. 2(a) shows the contents of the input information to be sorted 2 written in a file on the computer. The input information to be sorted 2 is an aggregation of basic information units 4 each comprising sort key information 1 and associated information 3. FIG. 2(b) shows the initialized direct access memory V to save the frequency of usage information of the sort keys 6, by sort-key type The range of memory V, "1" to "8", corresponds to the minimum value of the sort-key "1" and the maximum value of the sort-key "8". FIG. 2(c) illustrates how to make the frequency of usage information in memory V by each sort-key as the address, reading sort-key information 1 of every information to be sorted 2 sequentially and add one to the memory V addressed by the sort-key value. Then the frequency of usage information is completed in the memory V. This process corresponds to program step 81 to 83 in FIG. 9(b). FIG. 2(d) illustrates how to make the accumulation information 7 from the frequency of usage information 6 in memory V. This process corresponds to program step 86 to 90 in FIG. 9(b).

The initial value of accumulation is "1". From smaller address to larger address, get the frequency information of the memory V in the address save the accumulation to the memory V in the address, add the value of the frequency information 6 to the accumulation, repeat the process from address "1" to "8" then the accumulation information is prepared in the memory V. In the present embodiment, the ascend sort process is illustrated, but the same result is obtained by repeating the process from address "8" to "1" if the descend sort process is desired. The memory V is used as the common memory region for the frequency information and accumulation information. The invention has no difference if it is generated in different memory.

The accumulation information 7 has the meaning of the post-sort sequence information 8 for each sort-key information unit as shown in FIG. 2(e). FIG. 2(f) illustrates how to use the post-sequence information 8 and how to implement it. For example, information unit denoted by the strip has such sort-key information as "8", so the post-sort sequence is "8", the value of memory V addressed by "8". So the information unit must be set at eighth position in the output data. After output, add one to the value of memory V addressed by "8" and the value of memory V becomes "9" FIG. 2(g) explains the contents after those process. The above process is repeated until the sorted information 10 is obtained.

Assuming that N information is to be sorted and maximum count is K, the number of steps or the computer processing time T required to sort all of the information is approximately $$T = Cr(N+K)$$

Thus, the computer processing time T is improved over that of the Quick-Sort method. However, in the latter method which requires the pointer control, a waiting time for the processing may become long depending on the capacity of the main memory of the computer because the continuity of the data is not assured. Further, the pointer control requires an essentially complex process.

The essential advantage of the present invention is not affected by renaming of the memory and duplicate usage of the memory array, which steps are necessary in the sorting process. While the sorting in the ascending order is used in the present embodiment, the same effect is attained when the sorting in the descending order is used. The sort key information need not be limited to numerals but it may be a character string.

Figure 3:
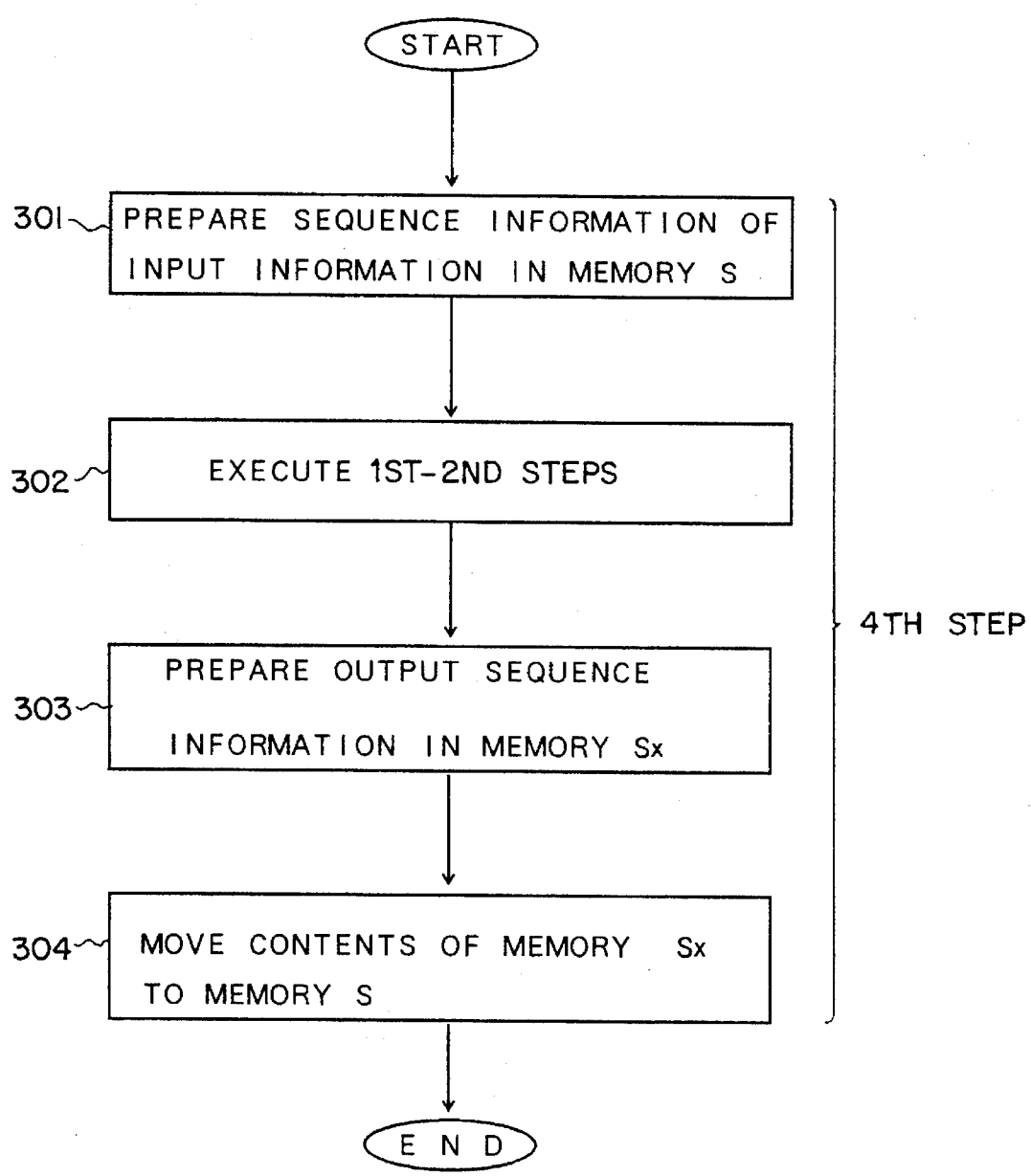
FIG. 3 shows a flow chart of the second embodiment of the present invention.

The second embodiment is now explained specifically with reference to the drawings. FIG. 3 illustrates the flow chart of the fourth step of the present embodiment by using the direct access memory S (as in 301) for sequence number of the unit of the information to be sorted (as in 302) and the other sub direct access memory Sx for post-sort sequence number of the unit of the information to be sorted (303). By use of S and Sx, the information to be sorted is not written directly, but written to the sequence number memory S that accesses the information to be sorted in the post-sort sequence (304).

More specific expression is given with reference FIGS. 4(a) to 4(f). FIG. 4(a) illustrates the information to be sorted. FIGS. 4(b) to 4(f) illustrate the first to third steps of the present invention. As shown in FIG. 4(b), first of all, the range of the sort-key is "1" to "8" as the minimum, and maximum value, the memory V having the memory of that range is initialized. In FIG. 4(c), read one information unit of the information to be sorted and add one to the memory of V addressed by the sort-key value of the information unit. In this step, the type of sort key is read from the sort key information 1, and the frequency of usage information 6 by type is prepared in the memory V. For example, in FIG. 4(a), the number "6" as the sort by information 2 appears three times. Accordingly, in FIG. 4(c), the frequency of usage information 6 by type which corresponds to "6" is "3". FIG. 4(d) shows a result of the third step of preparing the frequency of usage accumulation information 7 of the sort keys in the memory V based on the frequency of usage information 6 by type. Say m is the value of sort-key, the first value of accumulation is "1" and the frequency of usage is sequentially added from m=1 to m=8, when m=1, V(1)=1. When m=2, V(2)=3 because the frequency of usage "2" of m=1 is added. When m=3, V(3)=4 because the frequency of usage "1" of m=2 is added. When m=4, V(4)=6 because the frequency of usage "2" of m=3 is added. Similar steps are repeated until m=8 is reached, when the accumulation information 7 of the sort key is completed. FIGS. 4(e) to 4(f) illustrate the fourth step of preparing the post-sort sequence information 8 in the memory Sx. For example, for the basic information unit written at first record of the information 2 to be sorted, the sort key information 1 is "8". Thus, V(8) of the accumulation information 2 of the sort keys is looked up. The content of V(8) is "11". Thus, the pre-sort sequence "1" of the information 2 to be sorted is written into the post-sort sequence information Sx(11)=1. "1" is added to V(8) of the accumulation information 2 of the sort keys to update it to "12". Then, the information 2 to be sorted is examined in a similar manner to complete the post-sort sequence information Sx. After processing every sequence memory S, and copying Sx to S, the process is completed.

The essential advantage of the present invention is not affected by renaming of the memory and duplicate usage of the memory array, which are necessary in the sorting process. While the sorting in the ascending order is used in the present embodiment, the same effect is attained when the sorting in the descending order is used. The sort key information need not be limited to numerals but it may be a character string.

The third embodiment is now explained specifically with reference to the drawings. FIG. 5 illustrates the flow chart of the fifth step according to the first embodiment for carrying out the process of block 501–503 a plurality of times for information having the plurality of counts to be sorted, starting from a lower priority count and using the count as a current count, as indicated by the loop from 504–501.

The meaning of the sort for the information having the plurality of counts to be sorted, is as follows. The counts to be sorted have various priorities. Information to be sorted must be sorted by the higher priority to lower priority; for example, the lower priority is only evaluated when the units of the information to be sorted have the same higher priority. Hence, the present invention keeps always the sequence of the units of the input information if they have the same counts, the present invention requires no complex decisions in each step.

More specific expression is given with reference to FIGS. 6(a) to 6(b). FIGS. 6(a) and 6(b) illustrate the sorting method of the count information having two sort keys by the fifth step. The first to third steps are processed by using non-priority sort key 15 having a lower priority order as an overall sort key for the sorting process to obtain sort result information 18 by the non-priority sort key 15 as shown in FIG. 6(a). Finally, the content of the non-priority sort information 16 is regarded as the information to be sorted 2 and the first to third steps are again processed by using a priority sort key 14 as the over all sort key to obtain sort result information 21 by the two sort keys as shown in FIG. 6(b).

The means of the present invention keeps always the sequence of the units of the input information if they have the same counts, thus the present invention to sorting the information having plurality of counts to be sorted, is done only repeat the same process of the first embodiment repeatedly from the lower priority count to higher priority count and the present invention process requires no complex decisions in each step, the present invention requires less computer cost than the process by the prior art.

FIG. 7 shows a flow chart of sixth step of the sorting method of the third embodiment. Where the sort keys range over a wide area, the sort keys are divided into higher order numbers to lower order numbers (701), and set the higher priority from higher order numbers, and lower order numbers to lower priority (702). The sorting process is carried out by the fifth step for information having plurality of sort keys (703), starting from the lower priority counts to higher priority counts as illustrated.

FIG. 8 shows a flow chart of the seventh step of the sorting method of the third embodiment. The information having the plurality of counts to be sorted is not directly processed but the fifth step is carried out based on the address memory S which stores the sequence of the information. Blocks 801, 803, and 804 correspond to 501, 503, and 504 of FIG. 5. Block 802 differs from 502 in that the fourth step is performed.

Computer program implementation of the seventh step is shown in FIGS. 9(a) and 9(b) and a result of execution of the program is shown in FIG. 9(c). The input information to be sorted is shown in FIG. 9(c). The present program is written by the C language on the Solbourn workstation. In FIGS. 9(a)–(b), program lines 28–36 correspond to the first operation of the fourth step; program line 44, to the first step and the second step, third step or third operation of step 4, or the first loop operation of the fifth step; program line 52, to the second loop operation of the fifth step; program lines 79–83, to the first step; program lines 85–90, to the second step; program lines 92–97, to the third step or the third operation of step 4; and program lines 98–100, to the fourth operation of step 4. FIG. 9(c) shows the result of execution of this code.

FIG. 10 shows a flow chart of ninth means of the eight step of the sorting method of the third embodiment. The information having the large counts to be sorted is not directly processed but the sixth and seventh steps are carried out based on the address memory S which stores the sequence of the information. Blocks 1001 and 1002 correspond to 701 and 702 of FIG. 7. Block 1003 differs from 703 in that the seventh step is performed.

In the third embodiment, the present invention keeps always the sequence of the units of the input information if they have the same counts, the present invention requires no complex decisions in each step.

In the third embodiment, the count information is represented by numerals. The present invention is also effective to the sorting of characters and managed as numerals on the computer. The essential advantage of the present invention are not affected by renaming memories and the saving of the memories.

In accordance with the present invention, the frequency of usage information designates the write position of the post-sort sequence information and sorts the counts information in the ascending or descending order. Accordingly, the computer cost for the processing is given by $$T\text{--}N$$

where N is the total number of unit count information to be processed. It is cheaper than that of the Quick-Sort method which has been considered most inexpensive.

We claim:

1. A system for sorting count information in a memory of a computer, the count information representing an order of priority of processing of a plurality of basic information units, the system comprising:

first means for reading the count information to be sorted to prepare a representation of said count information in a first direct-access memory, the representation having a count range of the count information as an address range;

second means for incrementing by one the first direct-access memory for each count of the count information to prepare frequency of usage information for each count;

third means for initializing accumulation of the frequency of usage information of the count stored in a second direct-access memory to zero, adding the frequency of usage information or the address to the accumulation in an ascending order of the address of the second direct-access memory when the sorting in the ascending order is desired and in descending order of the address when the sorting in the descending order is desired, and writing the accumulation prior to the addition of the frequency of usage into the second direct-access memory designated by said address to prepare accumulation information of the counts starting from 1 and smaller than each count into the second direct-access memory when the sorting in the ascending order is desired and prepare the accumulation information of counts larger than each count when the sorting in the descending order is desired; and fourth means for (i) writing a unit of the count information from the beginning, as the units of the post-sort information, the accumulation stored in the second direct-access memory having the counts as the address, as the sequence of the unit of post-sort information, and (ii) adding one to the accumulation in the second direct-access memory to prepare the sequence for the next unit of the count information having the same count, and for repeating operations (i) and (ii) for every unit of the input information.

2. A system for sorting count information according to claim 1, further comprising means for causing the system to operate a plurality of times for information having a plurality of types of count information to be sorted, starting from a lower priority one of said types of count information and using each of the plurality of types of count information in turn as a current count.

3. A system for sorting count information according to claim 1, further comprising means for dividing each count of the count information to be sorted into numbers, each of said numbers having an appropriate number of digits, restricting the range of the divided counts into a narrow range, and causing the system to operate sequentially, starting from a low order number.

4. A system for sorting count information according to claim 1 further comprising sequence information writing means for writing only sequence information of one unit of the count information into a third direct-access memory by using the accumulation information as an address of the third direct-access memory for each count of the count information, and adding one to the accumulation information to prepare a post-sort address sequence in the third direct-access memory.

5. A system for sorting count information according to claim 4 further comprising means for causing the sequence information writing means to operate a plurality of times for the count information, starting from a lower priority count and using the count as a current count.

6. A system for sorting count information according to claim 4 further comprising means for dividing the counts to be sorted into numbers, each of said numbers having an appropriate number of digits, restricting the range of the numbers to a narrow range, and causing the sequence information writing means to operate sequentially, starting from a low order number.

7. A method of sorting count information in a memory of a computer, the count information representing an order of priority of processing of a plurality of basic information units, the method comprising the following computer implemented steps:

(a) reading the count information to be sorted to prepare a representation of said count information in a first direct-access memory of the computer, the representation having a count range of the count information as an address range;

(b) incrementing by one the first direct-access memory of the computer for each count of the count information to prepare frequency of usage information for each count;

(c) initializing accumulation of the frequency of usage information of the count stored in a second direct-access memory of the computer to zero, adding the frequency of usage information or the address to the accumulation in an ascending order of the address of the second direct-access memory of the computer when the sorting in the ascending order is desired and in descending order of the address when the sorting in the descending order is desired, and writing the accumulation prior to the addition of the frequency of usage into the second direct-access memory of the computer designated by said address to prepare accumulation information of the counts starting from 1 and smaller than each count into the second direct-access memory of the computer when the sorting in the ascending order is desired and to prepare the accumulation information of counts larger than each count when the sorting in the descending order is desired; and (d) (i) writing a unit of the count information from the beginning, as the units of the post-sort information, the accumulation stored in the second direct-access memory of the computer having the counts as the address, as the sequence of the unit of post-sort information, (ii) adding one to the accumulation in the second direct-access memory of the computer to prepare the sequence for the next unit of the count information having the same count and repeating steps (d)(i)–(ii) for every unit of the input information.

8. A method of sorting count information according to claim 7, further comprising the computer implemented step of performing steps (a)–(d) a plurality of times for information having a plurality of types of count information to be sorted, starting from a lower priority one of said types of count information and using each of the plurality of types of count information in turn as a current count.

9. A method of sorting count information according to claim 7, further comprising the computer implemented step of dividing each count of the count information to be sorted into numbers, each of said numbers having an appropriate number of digits, restricting the range of the divided counts to a narrow range, and performing steps (a)–(d) sequentially, starting from a low order number.

10. A method of sorting count information according to claim 7, further comprising the following computer implemented steps:

(e) writing only sequence information of one unit of the count information into a third direct-access memory of the computer by using the accumulation information as an address of the third direct-access memory for each count of the count information; and (f) adding one to the accumulation information to prepare a post-sort address sequence in the third direct-access memory of the computer.

11. A method of sorting count information according to claim 10 further comprising the computer implemented step of performing steps (e)–(f) a plurality of times for the count information starting from a lower priority count and using the count as a current count.

12. A method of sorting count information according to claim 10 further comprising the computer implemented steps of dividing the counts to be sorted to numbers, each of said numbers having an appropriate number of digits, restricting the range of the numbers to a narrow range, and performing steps (e)–(f) sequentially, starting from a low order number.

* * * * *